United States Patent [19]
Clouthier et al.

[11] Patent Number: 5,949,964
[45] Date of Patent: Sep. 7, 1999

[54] METHOD AND APPARATUS FOR HALFTONING OF IMAGES IN A PRINTER

[75] Inventors: Scott C. Clouthier, Boise; Douglas Heins, Burley; Brian E. Hoffmann; James R. Nottingham, both of Boise, all of Id.; Gary L. Vondran, Jr., Winchester, Mass.

[73] Assignee: Hewlett-Packard Company, Palo Alto, Calif.

[21] Appl. No.: 08/877,343

[22] Filed: Jun. 17, 1997

[51] Int. Cl.[6] .................................................. G06F 15/00
[52] U.S. Cl. ...................... 395/109; 382/224; 382/251; 382/237; 358/534; 358/456; 358/429; 358/462; 358/467
[58] Field of Search .................................. 395/109, 101, 395/102, 114, 115, 116, 112, 117; 358/534, 535, 536, 455, 456, 457, 458, 459, 460, 298, 462, 429, 466, 467; 382/237, 270, 176, 180, 224, 164, 165, 170, 171, 172, 173, 243, 251, 274, 275, 282

[56] References Cited

U.S. PATENT DOCUMENTS 5,337,160  8/1994  Jones ........................................ 358/447
5,542,031  7/1996  Douglass et al. ........................ 395/109
5,704,021  12/1997  Smith et al. ............................. 395/109

OTHER PUBLICATIONS

Journal of Electronic Imaging, vol. 3(3)., Jul. 1994, pp. 257–275 Peter R. Jones, "Evolution of Halftoning Technology in the Unites States Patent Literature".

Primary Examiner—Dov Popovici

[57] ABSTRACT

A method for halftoning an image to be rendered onto a media sheet includes the steps of: classifying data portions of a received data stream into one of plural image types, each image type to be subjected to a particular halftone procedure; assigning to each data portion of a common image type, a common identifier and then converting the data portions into a raster representation; subjecting segments of the raster representation to individualized halftone procedures, each segment of the raster representation that is assigned a common identifier being subjected to an identical halftone procedure; and rendering the raster representation onto a media sheet, subsequent to the halftone process. The apparatus for performing the halftone method places the halftone operation subsequent to the rasterization operation and thereby avoids anomalies which occurred in the prior art. Further, the apparatus enables halftone tables which are utilized during the halftone procedure to be altered so as to enable improvements to the halftone method.

7 Claims, 3 Drawing Sheets

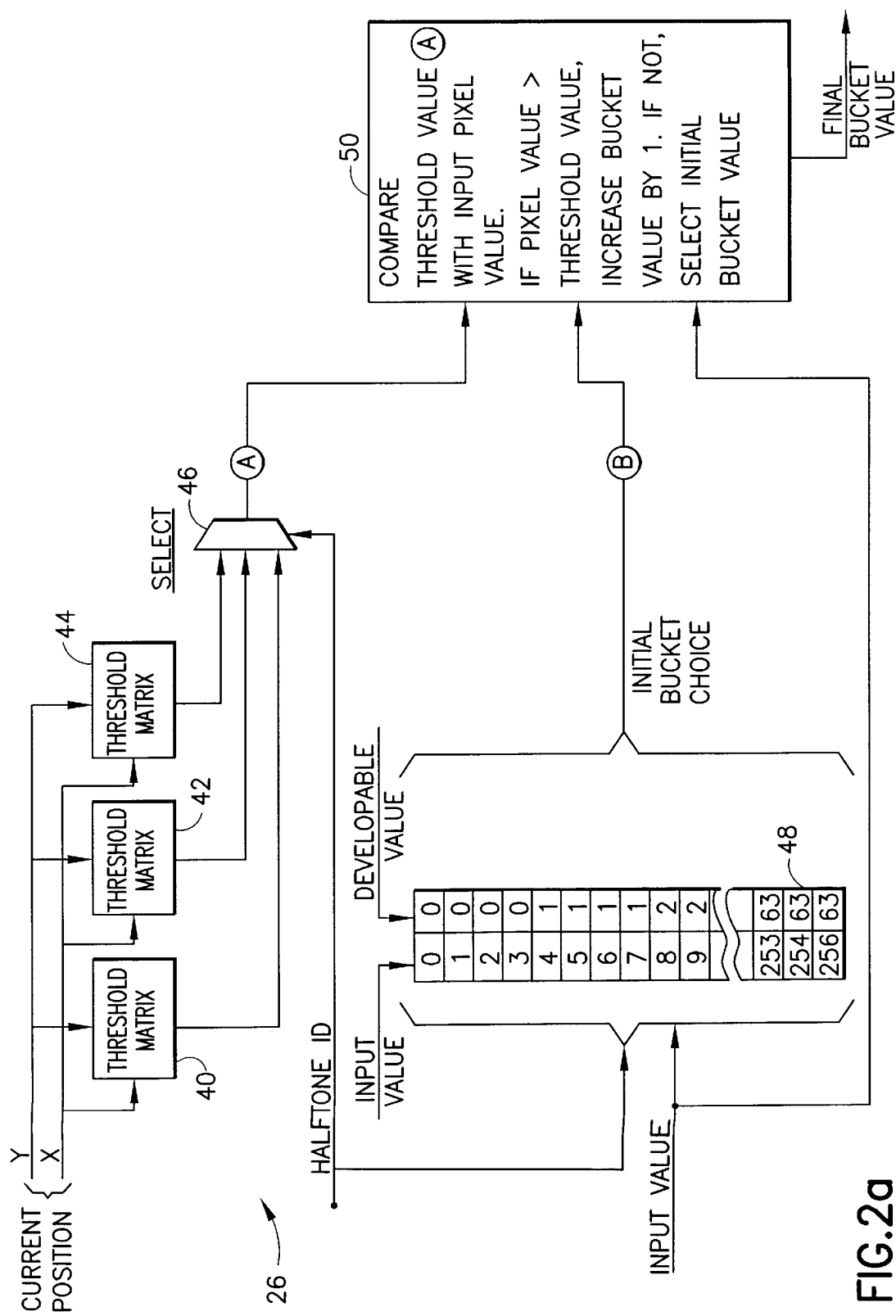

METHOD AND APPARATUS FOR HALFTONING OF IMAGES IN A PRINTER

FIELD OF THE INVENTION

This invention relates to halftoning processes and, more particularly, to a method and apparatus for halftoning which enables multiple halftone procedures to be implemented, depending upon the character of the image to be halftoned.

BACKGROUND OF THE INVENTION

Halftoning is a process that is used to convey gray scale information in printers which typically can print only black or white. Many halftone concepts and terms now used in electronic printing originated with the classic offset printing press. Printing presses can usually print areas of single intensity as they have only an ability to apply ink to a page or not apply ink to the page. This limited ability results in only two colors, i.e., that of the ink and that of the print media. By varying the size of printed dots, however, it is possible to give the impression of various shades of gray.

In electronic black and white printers, gray scales are accomplished by building a palette of grays that consists of clusters of black dots. A given cluster with more black dots is darker, while a cluster with less black dots is perceived as a lighter gray.

Halftone principles and procedures are applicable to color printers as well. In a color printer, the halftone technique is applied to each color plane (usually Cyan, Magenta, Yellow and blacK (CMYK)). Instead of generating only shades of gray, the printer provides mixtures of varying intensities of the four color planes. Layering of those variable intensity color planes enables the printing of a full color document.

Current implementations of halftoning techniques in laser printers are best suited to one type of a printable object (such as an image, text, line art, etc.). Many times when a printer employs a particular halftone technique with respect to a combination of printable objects, one printable object looks bad while another printable object looks good. Borders between printable objects can also show visually unappealing artifacts. In most laser printers, halftone patterns used by the printer to achieve a halftone effect are fixed within the printer's read-only memory. Thus, to correct a visual artifact or poor print quality, the user must change the printable object to be printed to accommodate the halftone pattern.

In prior solutions to the halftoning problem, design engineers chose a halftone pattern or an algorithm that was a reasonable compromise between various printable objects. A halftone was chosen to minimize the artifacts between printable objects, while at the same time providing a reasonable approximation of a continuous tone in the print output. The disadvantage of this approach was that the print quality for some printable objects was sacrificed by the compromise. As an example, if text was included within a picture image, and a single halftone technique was applied to the combined image, a visually unappealing border often occurred between the text and the image. More specifically, the crisp edges associated with the text were lost or, in the alternative, the picture showed objectionable contour lines where there should have been gentle transitions of gray scale.

Currently, a host processor operating under the Windows operating system (a Trademark of the Microsoft Corporation) employs a functionality within the Windows operating system called "graphics device interface" to perform the assembly and transmission of a color image to a printer. The color data is transmitted to the printer as a data stream of 3 or 4 eight bit color values per pixel. The host processor transmits to the printer three successive image planes, each plane comprising a single color of the color image data (i.e., red, green and blue or RGB). Thereafter, the printer subjects the individual color plane image data to a rasterization procedure so as to achieve an intermediate page format which, while not yet printable, is in raster form.

In the prior art, halftoning was performed during the rasterizing operation. Because raster operations modify the image data, constraints were placed on when halftoning could be performed and what kinds of halftoning could be applied. Further, the prior art halftoning procedure subjected all image data on the page to a common halftoning procedure, with a result being that the halftoning action was a compromise between desired resolution and desired intensity. Lastly, if, during an overlap operation, images having different line per inch resolutions are superimposed, the exclusive OR procedure described above causes undersized interference patterns in the image.

Accordingly, it is an object of this invention to provide an improved method and apparatus for halftoning of images which enables plural halftone procedures to be applied to a single image.

It is another object of this invention to provide an improved method and apparatus for halftoning of images wherein the halftone operation is applied to color planes comprising an already-rasterized image.

It is yet another object of this invention to provide an improved method and apparatus for halftoning of images wherein tables that are employed during the halftone operation can be altered so as to achieve improved halftone results.

SUMMARY OF THE INVENTION

A method for halftoning an image to be rendered onto a media sheet includes the steps of: classifying data portions of a received data stream into one of plural image types, each image type to be subjected to a particular halftone procedure; assigning to each data portion of a common image type, a common identifier and then converting the data portions into a raster representation; subjecting segments of the raster representation to individualized halftone procedures, each segment of the raster representation that is assigned a common identifier being subjected to an identical halftone procedure; and rendering the raster representation onto a media sheet, subsequent to the halftone process. The apparatus for performing the halftone method places the halftone operation subsequent to the rasterization operation and thereby avoids anomalies which occurred in the prior art. Further, the apparatus enables halftone tables which are utilized during the halftone procedure to be altered so as to enable improvements to the halftone method.

BRIEF DESCRIPTION OF THE DRAWINGS

FIGS. 2a and 2b comprise a block diagram which illustrates high level logical operations which are performed in a halftone module implemented by the invention.

DETAILED DESCRIPTION OF THE INVENTION

Figure 1:
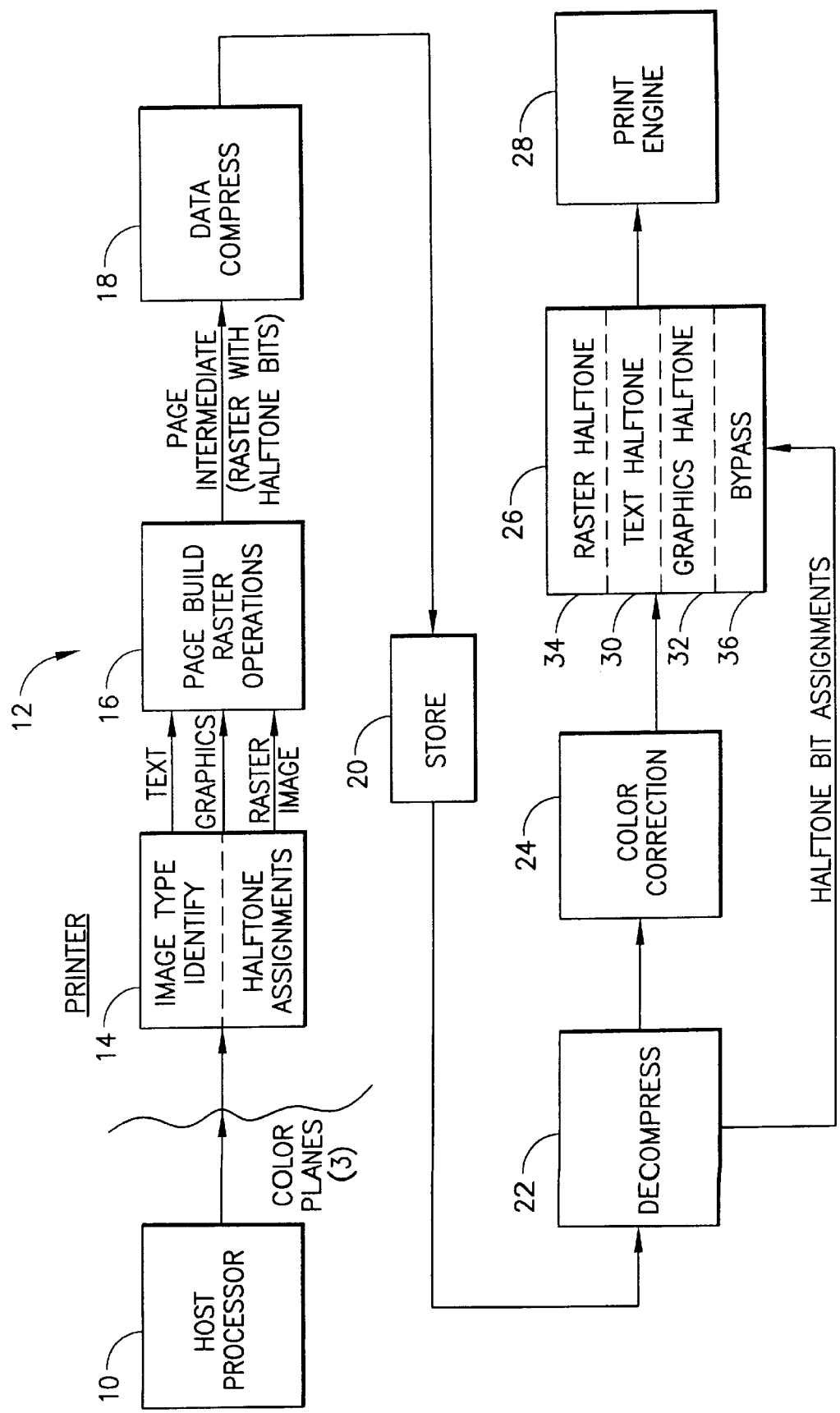
FIG. 1 is a block diagram which illustrates the data flow employed to achieve the invention.

Referring to FIG. 1, a host processor 10 includes a host-based application which enables preparation of a multicolor image that is to be rendered onto a media sheet by a printer 12. Host processor 10 configures the color image into, for instance, three color planes of pixel values, each color plane evidencing pixels of a different common color (e.g., red, green and blue). Thereafter, each pixel color plane is converted to a printer control language format and is transmitted to printer 12.

In the preferred embodiment, printer 12 is a laser printer, however, it is to be understood that the invention is applicable to any marking device which is capable applying halftoned images to a media sheet (e.g., inkjet printers, scanners, plotters, etc.). Printer 12 includes a central processor, a random access memory and a read-only memory for storage of various procedures which enable operation of printer 12. The physical structure of printer 12 is similar to that shown in the prior art (e.g., see U.S. Pat. No. 5,479,587 to Campbell et al., assigned to the same assignee as this Application, the contents of which are incorporated herein by reference).

Briefly stated, each of the rasterizing, data compression and decompression, halftoning and color correction procedures to be hereafter described are controlled by firmware contained in the read-only memory of printer 12. As will become further apparent, the tables which are employed in the halftone procedure are maintained in random access memory where they can be modified to provide improved halftoning actions.

Returning to FIG. 1, the color image planes in control language format are received by an image type identification module 14 which determines and classifies each type of image structure that is received from host processor 10. For instance, module 14 examines the input data stream to determine whether the code appearing therein is representative of a printer control language and, if so, assumes that the incoming image data is text. By contrast, if image type identification module 14 analyzes the incoming data stream and determines that it is configured in the format of HP/GL, a graphics language, then it is assumed that graphics is being received. Finally, if the incoming data stream is neither text nor graphics, image type identification module 14 assumes that the data is in the format of an already rasterized pixel image. Thus, image type identification module 14 is enabled to classify incoming data segments as either text, graphics or raster image.

The analysis action performed by image type identifier module 14 examines codes present in the input data stream to determine those which are indicative of a particular printer control language. For instance, PCL is a widely used printer control language and employs certain escape characters and other special codes unique to PCL which identify a PCL data stream. PostScript, another printer control language includes beginning of job markers which are indicative of a run of PostScript characters. For further description of keys and other language-specific codes which may be employed to identify the characteristics of a data stream, see U.S. Pat. No. 5,555,435 (Ser. No. 08/309,515) to Campbell et al., entitled "Automatic Language Boundary Identification for a Peripheral Unit that Supports Multiple Control Languages", and U.S. Pat. No. 5,392,419 to Walton, entitled "Language Identification System and Method for a Peripheral Unit, both assigned to the same assignee as this application.

In accordance with a determined image type classification, each data segment that has been identified as to type is assigned a halftone type identifier. The halftone type identifier is employed later in the processing chain to select a specific halftone procedure for application to the data segment. Thus, for instance, text may be assigned a "11" halftone type identifier; graphics a "01" halftone identifier; a raster image a "10" identifier and any image type which is not to be subjected to a halftone operation may be assigned a "00" halftone type identifier. Each assigned halftone type identifier travels with the associated data segment through the image processing chain in printer 12.

Once the image type has been identified and halftone type identifiers assigned, the image data is passed to a page build module 16 which performs a raster operation upon the received image data to arrive at a "page intermediate" format. More specifically, a page intermediate format is a rasterized image which requires additional processing before it can be passed to a print engine for rendering onto a media sheet. In accordance with the prior art, page intermediate processing comprises dividing the incoming print data into a number of contiguous page strips and processing the individual strips into the raster format. The page strip procedure enables more efficient use of printer random access memory, while enabling rapid handling of the input data.

During the page build function, high level data segments become converted into two dimensional arrays of pixels representing the image to be printed. "Rasterizing" is the fundamental action in the page build function. Further, during rasterizing operations in page intermediate processing, the overlapped color plane images are subjected to the exclusive OR operation referred to above. It is during such processing, in the prior art, that image anomalies would arise due to the inclusion of a halftoning action within the page build function. Those anomalies are avoided by removal of the halftone operations from page build module 16. In addition, the page build function associates a halftone type identifier with each pixel value in accordance with the original classification of the data segment that corresponds to the pixel. This results in the creation of a "halftone" plane that includes a spatially organized array of halftone type values which correspond to coincidently arrayed pixel positions in the associated color plane(s).

Once page intermediate processing is complete, page build module 16 passes the page intermediate data to a data compression module 18 which performs a compression action thereon and stores the resultant compressed page intermediate data, as indicated by store block 20.

When printer 12 is ready to render the stored page intermediate data, the stored data is accessed and subjected to a decompression action by a decompress module 22. Each color plane is operated upon separately, is serially accessed from memory, and is subjected to the decompression action. From decompress module 22, the pixels of a decompressed color plane are passed, in a pipeline fashion, through a color correction module 24, a halftone module 26 and to a print engine 28. Print engine 28 then renders the individual color plane pixels directly or indirectly onto a media sheet.

After a color plane is decompressed in decompression module 22, each pixel thereof still retains the halftone type identifier assigned thereto. As each color plane pixel is passed to color correction module 24, it's associated halftone type identifier is passed to halftone module 26 to enable a readying thereof for the respective pixel, after color correction. Within color correction module 24, the red, green or blue color values assigned to each pixel are converted to cyan, magenta, yellow and black color values, respectively. This action results in the creation of four color planes, one for each color.

Thereafter, each pixel color value is passed to halftone module 26 where, under control of the associated halftone type identifier from the halftone plane, it is subjected to a corresponding halftone action. Thus, if a pixel was assigned a "11" type value, it is subjected to a text halftone operation 30 before being transmitted to print engine 28. In a similar vein, if the pixel emanating from color correction module 24 was assigned a "01" type identifier, i.e., a graphics image, it is subjected to a graphics halftone procedure 32. Further, if the pixel emanating from color correction module 24 was assigned a "10" type identifier, i.e., a raster image, it is subjected to a raster halftone procedure 34. Finally, if the halftone type identifier indicates that a bypass is to occur (i.e., "00"), the pixel is passed directly through halftone module 26 via bypass 36 to print engine 28.

Each of the selected halftone procedures in halftone module 26 is designed to provide an optimized rendering for each image type, I. e., text, graphics, or raster image. For instance, since text images are typically composed of arrangements of thin lines and arcs, they are inherently detailed images with very high spatial frequency. In order for a halftone procedure to optimally reproduce halftoned text images, it must be designed to reproduce images with high spatial frequencies in order to minimize edge distortion and visual blurring of the halftoned image. From a practical perspective, however, halftone procedures which render at very high spatial frequencies can also accurately reproduce undesired high frequency print engine artifacts. Mechanical banding, for example, is a common high frequency print engine artifact that is caused by mechanical imprecision and vibration of moving parts in the print engine's drive train. Since these banding artifacts can be found in many print engines at spatial frequencies near text images, a halftone procedure optimized to reproduce text frequencies will also reproduce undesired print engine banding. Fortunately, banding is most easily perceived by humans in large solid fill images. Hence, a halftone procedure optimized for text images will sacrifice a reduction in the undesirable print engine artifacts to achieve superior edge definition and higher resolution of reproduced text images.

By contrast, raster images are typically composed of one large area, with regions of gradually varying tone within the image. Unlike text images, raster images typically represent reproductions of natural image scenes with relatively low spatial frequency. A halftone procedure optimized for lower spatial frequencies will be designed to accurately reproduce lower spatial frequencies, with a primary objective of visual smoothness for tone transitions in the image. In addition, a lower spatial frequency halftone will be unable to accurately reproduce high spatial frequencies, which is advantageous in suppressing high frequency print engine artifacts. In order to suppress these unwanted artifacts, however a halftone procedure designed for raster images may also suppress high frequency data inherent in the image itself. Hence a halftone procedure optimized for raster images will compromise resolution of high frequency image detail to achieve superior suppression of high frequency print engine artifacts.

Graphics images exhibit characteristics similar to both text and raster images. Some regions of a graphics image are inherently detailed, say at the edges of vectors and curves. Other regions within a graphics image can span large areas with gradual changes in tone, for example, with a gradient fill. Consequently, a halftone procedure designed for graphics images may make tradeoffs for resolution and tone smoothness that lie somewhere between those of text and raster images.

By placing halftone module 26 just before print engine 28, graphics anomalies are avoided that were previously seen when the halftone function was incorporated into page build module 16. Further, by enabling each pixel to be subjected to an individually selected halftone procedure enables individual image types to be subjected to a halftone procedure, which best enhances the presentation of the image.

Figure 2B:
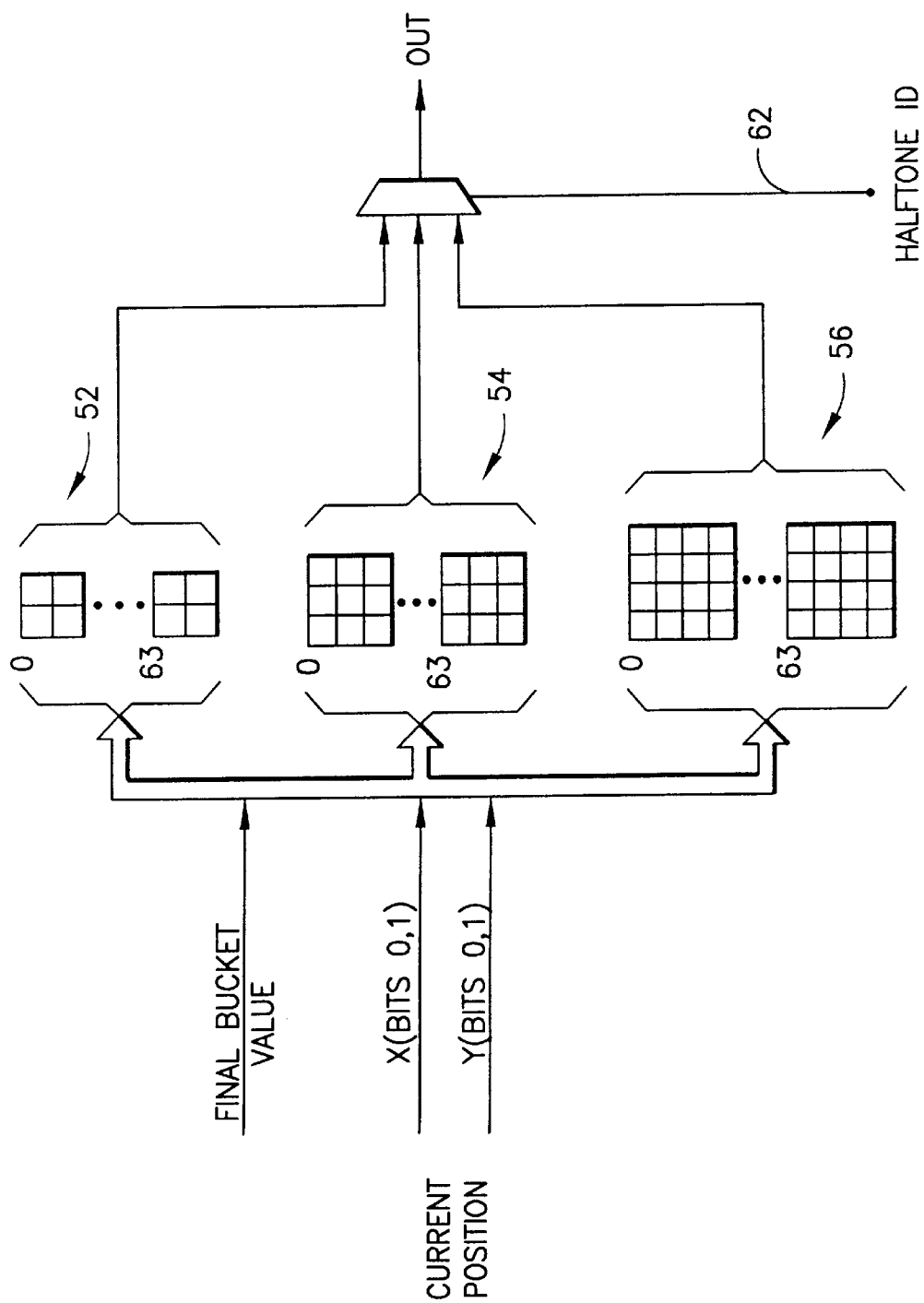

In FIGS. 2a and 2b, further details are shown of halftone module 26. This embodiment employs three bytes to fully describe the three component colors comprising the three color planes referred to above. An 8-bit value is capable of defining up to 256 different intensities of a particular color, however, many laser printers are not capable of producing that many different intensities. As a result, the halftoning action in halftone module 26 initially quantizes each 8-bit pixel color value into one of a number of "buckets", the number of which equate to the number of different color intensities which can be produced by print engine 28. For example, in a preferred laser printer embodiment, up to 64 different intensities can be produced—thus requiring that the 256 possible color pixel values be allocated to 64 separate "buckets". It is to be understood that the number of buckets may change in accordance with the specific halftone procedure that is to be applied to the image type.

Thereafter, each quantized color pixel value is compared to a threshold value in a matrix of threshold values which enables spatial distribution of the pixel value in accordance with the configuration of the threshold matrix. Application of a threshold matrix to achieve halftoning is known in the prior art and will not be considered here in detail. For instance, see "Fundamentals of Interactive Computer Graphics", Foley and Van Dam, Addison-Wesley, Copyright 1983, pages 597–602.

The threshold matrix comprises an (n×m) matrix of cells of threshold values which are "logically" tiled across the raster image. The threshold matrix provides an ability to spatially mix the quantized pixel input values so that a smooth dither is derived. Each cell of the threshold matrix includes a threshold value that represents the "spatial weight" of the corresponding location on a physical page. The logical "tiling" of the threshold matrix across the image enables each image pixel value, which corresponds in location to a particular cell location in the threshold matrix, to be compared to the corresponding cell threshold value. If the cell threshold value is greater than the quantized pixel value, the quantization value is increased to a next quantization level. If the cell threshold value is equal to or less than the quantized pixel value, the quantization value of the image pixel remains unchanged. In this manner, the quantized image pixel value is altered to provide better spatial mixing.

To improve the halftoning operation, and subsequent to the threshold matrix comparison action described above, the pixel is subjected to a dither procedure which enables an adjustment of a pixel's intensity level. This action trades off spatial resolution for intensity resolution. Each dither cell comprises an (N×N) grouping of pixel cells called a superpixel. If N=3, then a superpixel (or dither cell) comprises a 3×3 matrix of image pixels. The highest level of resolution is achieved when no dither cells are applied to the pixel image. In such case, the ultimate level of resolution is the individual pixel cell. When, however, a superpixel is created, the resolution decreases in accordance with the number of pixels contained in the superpixel.

Through the use of a superpixel, a number of different intensity levels can be achieved by adjusting values of various pixels within the superpixel. An appropriate superpixel is identified, based upon the quantized image pixel value which identifies the corresponding bucket; by the current position of the pixel on the physical page; and the output value from the threshold function which identifies the final bucket into which the pixel value has been quantized. The current position of an image pixel is important because superpixels must be able to be placed next to each other without causing interference patterns. A preferred implementation of superpixels is to allow N to be 1, 2, 3 or 4, where N=1 is equivalent to a bypass.

The above described quantization, thresholding and dithering actions will be better understood by the following detailed description of the elements and functionalities found in halftone module 26. With reference to FIGS. 2a, and 2b, the inputs to halftone module 26 comprise the image pixel color value and the current x,y position of the input image pixel on the page. The current position is derived from the processor which controls printer 12 (not shown) which, in turn, causes a sequencing of the image pixels out of color correction module 24 into halftone module 26. The x and y coordinates of the input image pixel are applied to, in this example, three threshold matrices 40, 42 and 44. It is to be noted that each threshold matrix is designed for application to a specific halftone procedure.

Depending upon the x,y position of the pixel, a corresponding threshold value is read out from each of threshold matrices 40, 42 and 44 and is fed to a select switch 46. Depending upon the halftone type identifier associated with the input image pixel, an output from one of threshold matrices 40, 42, 44 is selected and is output at A. Note that the configuration of threshold matrix tables 40, 42 and 44 enables the respectively stored threshold matrices to be altered in accordance with a particular desired halftone procedure. Thus, the threshold matrix for a raster image will be different from that applied to text and may further be different from that applied to graphics.

The input image pixel value is initially quantized by application to one of three quantization tables to enable conversion of the input image pixel value to a baseline quantization bucket. Only one quantization table 48 is shown in FIG. 2a. Note that if the input pixel value extends from 0–3 a baseline quantization value of 0 is output. In a similar manner, further input pixel values are quantized and output as baseline bucket values that are renderable by printer 28.

Each pixel value which is assigned to a baseline bucket is now reexamined to determine if its baseline bucket assignment should be altered. More specifically, if the pixel value exceeds a threshold value, the bucket value is increased by one. This action enables the creation of intermediate tone intensities which are otherwise not attainable.

A quantized pixel value is then applied to a compare function 50 which compares the quantized pixel value with the threshold value output from the respectively selected threshold matrix to achieve a thresholded output. If the quantized pixel value is greater than the threshold matrix value, then the quantized pixel value is incremented by one. If the quantized pixel value is equal to or less than the threshold matrix value, then the quantized pixel value is output unchanged at C.

As shown in FIG. 2b, the "thresholded" quantized image pixel value on line C (i.e., the final bucket value) is applied, in parallel, to three dither cell groups 52, 54 and 56. The final bucket value enables selection of a dither cell in a superpixel cell group (via a matching value). Note that there are an equal number of superpixel cells as there are final buckets. In addition, the lowermost two bits of the current x,y coordinate value of the image pixel are also applied to enable selection of one pixel in a superpixel, the superpixel being matching in value to the value of the final bucket value.

As above described, each superpixel is used to adjust the rendered intensity of an image pixel. More specifically, in this example, within each superpixel cell group there are 64 separate superpixels, with their respective pixels ranging from all OFF (the byte value=0) to all ON (the byte value=255). Further, since each pixel is represented by an 8-bit value, the pixel "ON" intensities may be varied over the range of the 64 superpixel cells.

Superpixel cell group 52 reduces the ultimate resolution of the image by a factor of 4, as each superpixel is equal to a four pixel grouping. Superpixel cell groupings 54 and 56 further reduce the ultimate resolution of the halftone image by factors of 9-1 and 16-1, respectively. It is to be understood that the superpixels are designed to best represent the image, given the capabilities of the print engine. For instance, if the print engine performs rasterization of a text image at 600 dpi, the superpixels to be applied to such halftoning will be designed to supply 600 dpi halftoning. Conversely, superpixels to be used with graphics images may be designed to output 200 dpi rendering to achieve enhanced edge smoothness.

To repeat, the selection of a superpixel is made by the quantized pixel value which is input on line C. As a result, a quantized pixel value input to superpixel cell groups 52, 54, 56 results in the selection of one superpixel in each of the superpixel cell groupings. The x, y coordinate value selects which pixel in the selected superpixels is to be accessed. The selected pixels are output to a multiplex switch 60 which selects one output from one of superpixel cell groups 52, 54 or 56, in dependence upon a halftone type identifier applied via line 62. The output from switch 60 is then sent to print engine 28 for rendering.

In such manner, the selective halftone procedure is applied to each input pixel of each color plane, as the input pixel is received by halftone module 26. This action is essentially a pipeline action and except for buffering required to accommodate differences in synchronization, the process operates in a pipeline fashion.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for halftoning of images to be rendered onto a media sheet, said method comprising the steps of:
    a) classifying data portions of a received data stream into one of plural types, each type to be subjected to one of plural halftone procedures;
    b) assigning to each data portion of a common type, a common identifier;
    c) converting said data portions into a raster representation comprising data segments that correspond to said data portions, each data segment comprising a multi-bit value indicative of a color or intensity of a pixel, compressing said raster representation and storing said compressed raster representation;
    d) accessing said compressed raster representation, decompressing said compressed raster representation and, in a pipeline manner, selectively subjecting said raster representation to said plural halftone procedures, each said data segment of said raster representation subjected to a quantization procedure in accord with a number of available printer intensity values and then subjected to one of said plural halftone procedures in accord with the associated common identifier, each said data segment associated with a common identifier subjected to an identical halftone procedure; and e) rendering said raster representation on to said media sheet, after said raster representation is subjected to said halftone procedures.

2. The method as recited in claim 1, wherein step a) classifies each said data portion as belonging to a common image type, including; text, raster image or graphics.

3. The method as recited in claim 1, wherein each said halftone procedure provides to a common type data segment, either enhanced intensity with a reduction in resolution, a best available resolution with a reduction in intensity, or an improvement in either a level of intensity or resolution, at the cost of the other.

4. The method as recited in claim 1, wherein step c) carries forward the common identifiers in association with said data segments.

5. A printer with means for halftoning of images to be rendered onto a media sheet, said printer comprising:

image type identification means for classifying data portions of a received data stream into one of plural image types, each image type to be subjected to a selected one of plural halftone procedures and for assigning to each data portion of a common image type, a common identifier;

raster operation means for converting said data portions into a raster representation comprising data segments that correspond to said data portions, said data segments comprising multi-bit color values;

memory means for storing said raster representation after said converting;

selective halftone means for accessing said raster representation from said memory means and for subjecting said raster representation to said plural halftone procedures, each data segment of said raster representation that is associated with a common identifier subjected to an identical halftone procedure, said selective halftone means subjecting said color values to a quantization procedure so as to adjust said color values to be compatible with said printer;

plural threshold matrix means manifesting threshold values for comparison with said color values that have been adjusted, to accomplish a spatial dithering thereof, each of said plural threshold matrix means manifesting a threshold matrix that is unique to a halftone procedure, and said plural threshold matrix means maintaining each said threshold matrix in random access memory so as to be user-alterable; and print engine means for rendering said raster representation on to said media sheet, after said raster representation is subjected to said halftone procedures.

6. The printer as recited in claim 5, wherein said image type identification means classifies each said data portion as belonging to a common image type, including; text, raster image or graphics.

7. The printer as recited in claim 5, wherein said raster operation means causes the common identifiers to be carried forward in association with said data segments.

* * * * *